April 3, 1956  J. C. YOUNG  2,740,463
ROTATABLE VEHICLE SEAT CONSTRUCTION
Filed Jan. 12, 1953  2 Sheets-Sheet 1
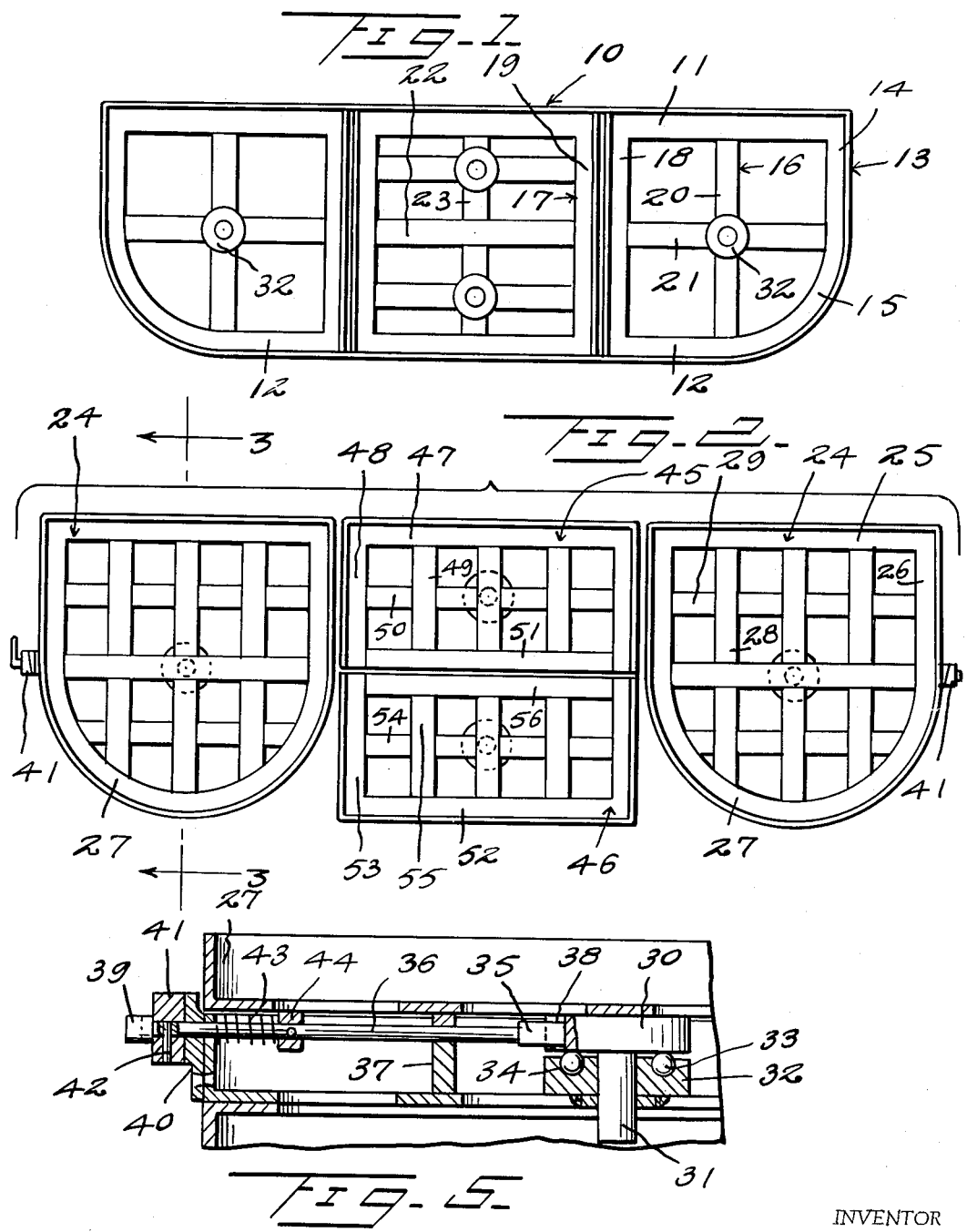
INVENTOR
John C. Young
BY Kimmel & Crowell
ATTORNEYS

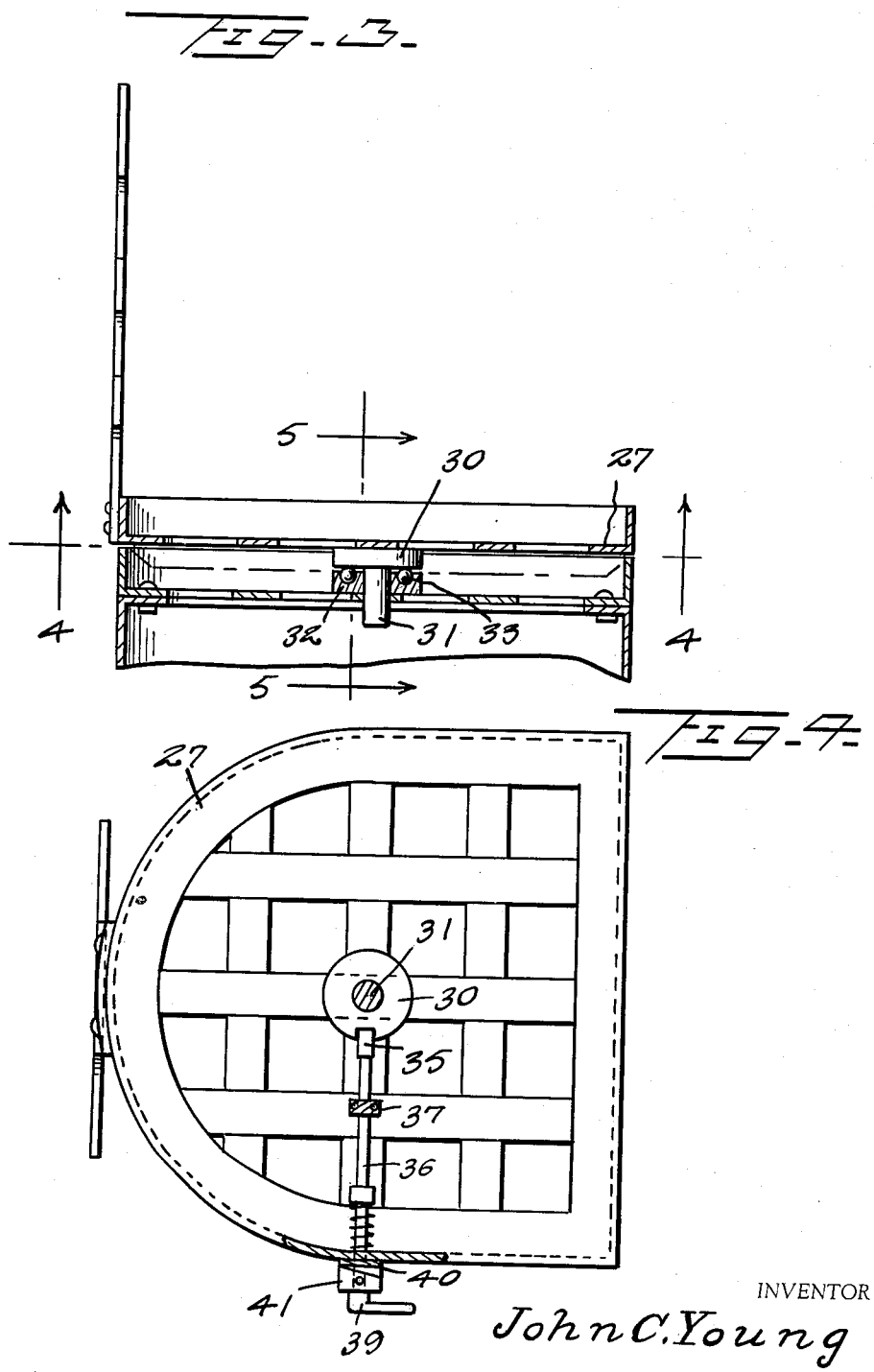

United States Patent Office 2,740,463
Patented Apr. 3, 1956

2,740,463

ROTATABLE VEHICLE SEAT CONSTRUCTION

John C. Young, Pittsburgh, Pa.

Application January 12, 1953, Serial No. 330,817

1 Claim. (Cl. 155—5)

This invention relates to an improved front seat construction for automobiles.

An object of this invention is to provide a vehicle seat construction wherein the seat is divided into outer seat elements and an intermediate seat element, with the outer seat elements pivotally mounted for outward swinging movement to facilitate the entrance or exit from the seat.

Another object of this invention is to provide in a pivoted seat construction, an improved locking means for locking the seat in normal position.

A further object of this invention is to provide a seat construction which is simple in construction so that it can be sturdily made at a relatively low cost.

With the above and other objects in view, my invention consists in the arrangement, combination and details of construction disclosed in the drawings and specification, and then more particularly pointed out in the appended claim.

In the drawings—

Figure 1 is a plan view of a front seat base constructed according to an embodiment of this invention, Figure 2 is a plan view of the seat frames associated with the base, Figure 3 is a sectional view taken on the line 3—3 of Figure 2, Figure 4 is a sectional view taken on the line 4—4 of Figure 3, Figure 5 is a fragmentary sectional view taken on the line 5—5 of Figure 3.

Referring to the drawings, the numeral 10 designates generally a base frame which is formed of a front angle bar 11, a rear angle bar 12, and opposite end angle bars 13. The angle bars 13 have a straight longitudinal front portion 14, with an arcuate rear portion 15. The frame 10 is divided into a pair of outer sections generally indicated at 16, and an inner section 17. The sections 16 and 17 are separated by means of longitudinal frame bars 18 and 19 which are secured between the front and rear bars 11 and 12 respectively.

Each outer frame section 16 includes a longitudinal bar 20 and a transverse bar 21. The intermediate section 17 also includes a plurality of transverse bars 22 and a centrally disposed longitudinal bar 23. A pair of outer seat frames generally indicated at 24 are adapted to engage on the outer frame sections 16, and each frame member 24 is formed of a front bar 25, side bars 26, and an arcuate rear bar 27.

A plurality of longitudinal flat bars 28 are secured between the front bar 25 and the rear bar 27 and a plurality of crossed bars 29 are secured between the side bars 26. The crossed bars 28 and 29 form a webbing for supporting a resilient seat construction, and at the axis of the arcuate rear portion 27 there is disposed a disc-shaped member 30 which may be welded or otherwise secured to the crossed points of a pair of bars 28 and 29.

A depending stud or pivot member 31 extends downwardly from the disc or plate 30 and rotatably engages in a bushing 32 which is welded or otherwise fixed to the upper side of the crossing point between the web forming bars 20 and 21. Anti-friction balls 33 engage in an annular groove 34 formed in the bushing 32 and bear against the lower side of the disc 30.

In order to provide a means whereby each end frame 24 may be locked in its normal seating position I have provided a locking bolt 35 which is carried by an elongated rod or bar 36, rotatable in bearings 37. The bolt 35 is adapted to engage in a keeper recess 38 formed in the periphery of the disc 30. The bar or rod 36 projects outwardly through the outer one of the side bars 26, and has a handle 39 secured thereto. A cam member 40 is fixed to the outer one of the side bars 26, and a complementary cam member 41 is fixed, as by fastening means 42, to the rod 36.

A spring 43 engages about the rod 36 and bears at its outer end against the outer one of the side bars 26, and bears at its inner end against a collar 44 which is secured to the rod 36. Spring 43 normally urges the bolt 35 inwardly to locking position within the keeper 38.

A pair of intermediate frame members or sections 45 and 46 are also engageable with the intermediate section 17. Seat frame section 45 is formed of a front bar 47 and opposite side bars 48. Crossed web forming bars 49 and 50 are secured in the frame 45 which also includes a rear or inner frame bar 51.

Seat frame member 46 is formed of a rear angle bar 52, opposite side bars 53, and crossed web forming bars 54 and 55. Bars 55, which are longitudinal bars, are secured between the rear bar 52 and an inner or front bar 56. The outer seat frame members 24 are adapted in their normal seating position to have their front bars 25 in substantial alignment, as shown in Figure 2.

When it is desired to enter one of the outer seat members 24, handle 39 is turned so as to withdraw bolt 35 from keeper 38. The seat frame may then be rotated outwardly and may be returned to its normal seating position whereupon handle 39 will be rotated to a locking position whereby spring 43 will move bolt 35 into registering keeper 38.

I do not mean to confine myself to the exact details of construction herein disclosed, but claim all variations falling within the purview of the appended claim.

What I claim is:

A vehicle seat construction comprising a base frame, a pair of outer seat members, an intermediate seat member, each of said outer seat member being formed of a front angle member, a pair of side angle members, an arcuate rear angle member integral with said side members, crossed web forming bars fixed to said front, rear and side angle bars, a disc secured to the bars of each of said outer seat members, said disc being provided with a keeper notch in the peripheral edge thereof, a depending stud carried by the disc of each outer seat member, bearings for said studs carried by said base frame, a pair of locking bolts, an elongated bar supporting each of said bolts, bearings rotatably mounting said bolts on said base, a cam on said base, a cooperating cam on said elongated bar engaging said cam on said base whereby rotation of said bar will retract said locking bolt from said keeper notch releasing said outer seat members from their normal locked seating position.

References Cited in the file of this patent

UNITED STATES PATENTS

| 875,494 | Bedell | Dec. 31, 1907 |
| 1,766,079 | Knight | June 24, 1930 |
| 2,576,004 | Fair | Nov. 20, 1951 |

FOREIGN PATENTS

| 320,877 | France | Aug. 27, 1902 |
| 359,492 | France | Jan. 23, 1906 |
| 409,792 | Great Britain | May 10, 1934 |